May 16, 1933.   W. T. ANDERSON, JR   1,909,797
METHOD OF FORMING ELECTRICAL LEAD-INS FOR FUSED QUARTZ DEVICES
Filed March 8, 1932
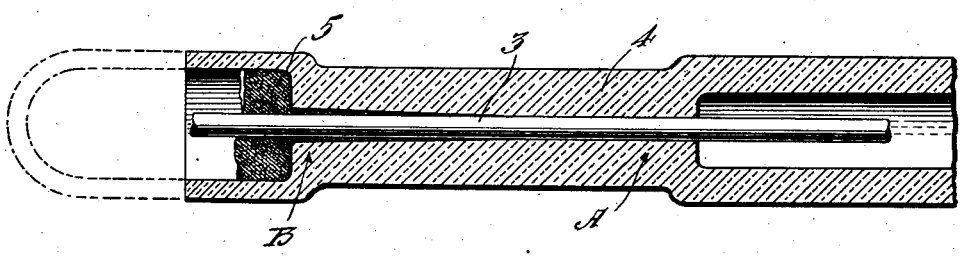
INVENTOR.
William T. Anderson Jr.
BY
ATTORNEY.

Patented May 16, 1933

1,909,797

UNITED STATES PATENT OFFICE

WILLIAM T. ANDERSON, JR., OF NEWARK, NEW JERSEY, ASSIGNOR TO HANOVIA CHEMICAL AND MANUFACTURING COMPANY, OF NEWARK, NEW JERSEY, A CORPORATION OF NEW JERSEY

METHOD OF FORMING ELECTRICAL LEAD-INS FOR FUSED QUARTZ DEVICES

Application filed March 8, 1932. Serial No. 597,460.

This invention relates to a method for constructing metallic electrical conductors for use in connection with gas tight fused quartz devices.

The introduction of metallic electrical conductors into vitreous evacuated and gas-filled systems has always been a problem. If the vitreous materials used are glasses, it has been found practical to seal the metallic conductor directly into the glass and to obtain a vacuum and gas tight seal provided the glass fused at a temperature lower than the fusing temperature for the metal; and provided that the coefficient of thermal expansion of the glass was the same or practically the same as that of the metal. These requirements for the gas tight introduction of metal conductors into glass are well known to the art and are freely discussed and described in publications (see for example, "Laboratory Glass Blowing", F. C. Frary, C. S. Taylor & J. D. Edwards, 2nd edition, McGraw Hill Book Company 1928).

Many attempts have been made to seal metallic conductors into fused quartz for the production and attainment of a gas tight seal. However, numerous difficulties have been encountered. For example, fused quartz has an extremely small coefficient of thermal expansion, $0.6 \times 10^{-6}$, and an alloy of nickel and iron, known as Invar, has a coefficient of thermal expansion approximating this value, and might possibly be fused into quartz to make a gas tight seal if it were not for the fact that the Invar metal melts at a temperature below the fusion and working temperature of quartz. Invar metal is fluid before the quartz can be worked, and as a result it is not possible to attain a seal between the two. No other suitable substances of similar expansion are known. Tungsten and molybdenum with expansion coefficients of approximately $4.2 \times 10^{-6}$ are the closest of the metals; and these two substances, in addition, have melting points substantially above the working temperature for quartz.

Attempts have been made to fuse tungsten and molybdenum into quartz to produce vacuum and gas tight seals. Thus in U. S. Patent No. 1,608,612, Nov. 30, 1926 is described a special treatment of molybdenum which enables it to be fused directly into the quartz. However, I found that according to the method described in the above patent seals could be made vacuum tight provided only very fine wires were employed. A seal which is capable of carrying one and more amperes of current, such as required for the operation of the quartz mercury arc, cannot be made by the method.

Metallic conductors made as described in the patent may be employed on gas discharge tubes which consume only a few milliamperes of current; but they cannot and have not been employed on quartz mercury arcs.

In the patent to Henri George No. 1,334,850, March 23, 1920, is described the use of tungsten embedded in fused quartz and it was claimed that such a conductor was gas tight and could be used with quartz mercury arcs. I have found that seals employing tungsten and quartz behave similarly to those with molybdenum and no one has succeeded in producing seals which are suitable for use with quartz mercury arcs and quartz discharge tubes that consume currents of one and more amperes.

Attempts have also been made to provide a seal for tungsten and molybdenum fused into quartz, the function of the seal being to make the union between the quartz and the metal gas tight. Examples of these seals are given in the catalogue of the Thermal Syndicate 1930 page 28. The sealing materials employed are lead or mercury. (See U. S. Letters Patents #1,118,812, Nov. 24, 1914 and #1,489,099, April 1, 1924.) The lead seals introduce manufacturing difficulties and are not very dependable in service.

Another form of metallic conductor that has been employed with some success consists of a ground joint between the metal, usually invar metal, and the quartz which is sealed by mercury. It has been expensive to manufacture and the number of failures have been high, due in a large part to the solubility of air and water in mercury and the subsequent passage of a portion of this air and moisture into the mercury arc device on which the conductor is employed. This device also does not withstand marked temperature changes and high temperatures, and the number of failures from these causes is high.

Still another form of metallic conductor which has been employed extensively on quartz mercury arcs consists of a metal sealed vacuum tight into a glass, which in turn is connected to the quartz by steps of glass of decreasing coefficient of thermal expansion until finally a glass step is reached that may be fused directly to the quartz. (See U. S. Patents 910,969; 1,014,757, Jan. 16, 1912; 1,191,630, July 18, 1916; 1,154,081, Sept. 1915; 1,558,524 Oct. 27, 1925.) For example, tungsten may be sealed vacuum tight to a commercial lead boro-silicate glass known as "Nonex", having the coefficient of thermal expansion $3.9 \times 10^{-6}$, which in turn may be fused to pyrex with the coefficient $3.2 \times 10^{-6}$, which in turn may be fused to the special glasses described in the above patents. These sealed conductors are quite sensitive to temperature changes, and the number of fractures at the joints between the various glasses is quite high.

It is an object of this invention to provide a method of making vacuum tight and gas tight metallic conductors for use with quartz gas filled devices, which conductors are inexpensive, durable, and capable of withstanding all temperature conditions to which such devices are subjected.

A further object is the provision of a method for producing efficient metallic conductors for use with gas tight and vacuum tight vapor electric devices at a cost of manufacture lower than has heretofore been possible.

These and other advantageous objects, which will later appear, are accomplished by the simple and practical construction and arrangement of parts hereinafter described and exhibited in the accompanying drawing, forming part hereof, and in which:—

The figure is a sectional view of a conductor made in accordance with my invention.

Referring to the drawing, the conductor is shown to comprise a metal core 3, enclosed in a sleeve 4 of fused quartz. The sleeve 4 fits the core very closely at the section indicated by the letter A, while at section B the sleeve is slightly spaced from the core, and the space is filled with a compound 5 hereinafter described.

The metal core 3 may be in the form of a bar, ribbon, rod or wire, the latter being the usual form. It is cleaned of oxide by any one of a number of well known chemical or physical methods. The metals usually employed as cores in my invention are tungsten, molybdenum, tantalum and platinum, all of which melt at a temperature higher than the working temperature of fused quartz. My invention is not restricted to these metals as there may be alloys which have the physical characteristics suitable for the construction of conductors in the manner described.

Another essential characteristic necessary for the successful performance of the metal conductor core 3 employed in my invention is the coefficient of thermal expansion. Fused quartz has a very small coefficient of thermal expansion, namely $0.6 \times 10^{-6}$, and none of the above mentioned metals can be sealed vacuum tight into quartz by fusion and at the same time be of sufficient cross section to conduct one or more amperes of current in continuous duty because their coefficients of thermal expansion are considerably different from that of fused quartz.

I have constructed vacuum tight conductors employing the above metals and fused quartz that will carry as much as fifty amperes of current without destruction. I am able to accomplish this provided the metal used has a coefficient of thermal expansion less than $9.0 \times 10^{-6}$ and a melting point higher than 1700 degrees centigrade, that is, higher than the melting point of fused quartz.

My method for accomplishing this will be described in detail. The metal core 3 is first placed within the fused quartz sleeve 4. It is most convenient to have the sleeve fit quite closely, thus if the metal be in the form of a wire 1 millimeter diameter, the bore can conveniently be 1.25 millimeter. One end of the quartz sleeve 4 is closed by fusion before the metal is introduced or by means of a suitable stopper; the first method, fusion, being preferable. The other end of the sleeve is attached to an evacuation pump, and the sleeve is evacuated. The function of the vacuum is two fold. The removal of air is necessary in order that the metal will not be oxidized during subsequent heat treatment. The reduction in gas pressure within the quartz sleeve assists in the process of forming the quartz about the metal. This will now be described.

The evacuated quartz sleeve containing the metal core is heated to the working temperature of fused quartz. This may be accomplished by flames or electrically. The quartz must be brought to a temperature of about 1650 degrees centigrade. The portion of the sleeve which will be on the external, that is, the atmospheric side of the conductor is heated first. The quartz softens and settles about the metal. The heating is continued along the sleeve and the intensity of the heating is increased as the end A of the sleeve, adjacent to the body of the quartz electric device, is approached, the quartz electric device being not shown in the drawing.

The conductor is then cooled to room temperature (24 degrees C.). If the heat treatment has been properly applied, the quartz will be free of cracks. The metal as it cools will contract more rapidly and to a greater extent than the quartz, and hence, will pull away from the quartz. The gap produced between the metal and the quartz will be greatest on the external end B of the conductor and the least on the end A to be attached to the gas filled electrical device.

The conductor is then removed from the evacuating system, the closed end opened, and the volatilized metal, if there be any, cleaned out by acid or gentle glowing.

The conductor may be then attached to the quartz electrical device. It is also practical in some instances to shrink the quartz sleeve about the metal while attached to the main body of the quartz electrical device, employing the procedure described above.

The metal core 3 is united, gas and moisture tight, to the quartz sleeve 4 by a compound which fills in part the gap between the metal core 3 and quartz sleeve, and which possesses physical properties that enable it to hermetically seal the metal to the quartz under all normal and operating conditions.

I have found that compounds capable of being used in my conductor may be prepared from mixtures of the higher hydrocarbons of the methane and benzene series. They must adhere firmly to both the metal and the quartz, be elastic, and at 100 degrees centigrade should have a fluidity corresponding to a viscosity of about 20,000 dyne-seconds per square centimeter.

The conductor is warmed to about 300 degrees centigrade and the compound is brought in contact therewith at which time it melts and flows about the metal, a portion passing into the space between the metal and quartz of the sleeve. The conductor is then cooled, and is ready for use.

From the above description it will be seen that I have provided a simple and convenient method of making gas tight metallic conductors for use in connection with gas filled fused quartz devices. While I have described my method in detail, it is understood that I am not restricted to the specific metals and compound set forth, as other metals and compounds may possibly be used without departing from the spirit of the invention set forth in the appended claims.

Having thus described my invention, what I claim as new and desire to secure by Letters Patent, is:

1. The method of constructing a metallic conductor for use on vacuum and gas-filled quartz electrical devices comprising, enclosing a metal core in a fused quartz sleeve having a bore of slightly greater diameter than the core, evacuating the sleeve, then vacuum heat treating the metal and sleeve to cause the quartz to fit tightly about the metal core at one end of the sleeve and to be slightly spaced from the core throughout the length of the core in the sleeve, the spacing gradually increasing as the other end of the sleeve is approached and then introducing in the space between the core and the sleeve a compound which at 100 degrees centigrade has a fluidity corresponding to a viscosity of about 20,000 dyne-seconds per square centimeter.

2. The method of constructing a metallic conductor for use on vacuum and gas filled quartz electrical devices, comprising placing a metal core in the bore of a fused quartz sleeve having a bore of slightly greater diameter than the core so that there is a substantially close fit between the core and sleeve, evacuating the sleeve, then vacuum heat treating the metal and sleeve throughout their length, the intensity of the heat being gradually increased from one end of the sleeve to the other end to cause the quartz sleeve to fit tightly about the core at one end, and to be slightly spaced from the core throughout its length, the spacing gradually increasing from one end to the other, and then introducing in the space between the core and sleeve a hydrocarbon compound to produce a gas tight seal.

3. The method of constructing a metallic conductor for use on vacuum and gas filled quartz electrical devices, comprising placing a metal core in the bore of a fused quartz sleeve having a bore of slightly greater diameter than the core so that there is a substantially close fit between the core and sleeve, evacuating the sleeve, then vacuum heat treating the metal and sleeve throughout their length, the intensity of the heat being gradually increased from one end of the sleeve to the other end to cause the quartz sleeve to fit tightly about the core at one end, and to be slightly spaced from the core throughout its length, the spacing gradually increasing from one end to the other, and then introducing in the space between the core and the sleeve a compound which at 100 degrees centigrade has a fluidity corresponding to a viscosity of about 20,000 dyne-seconds per square centimeter.

This specification signed this 29th day of February, 1932.

WILLIAM T. ANDERSON, JR.